Figure 1:
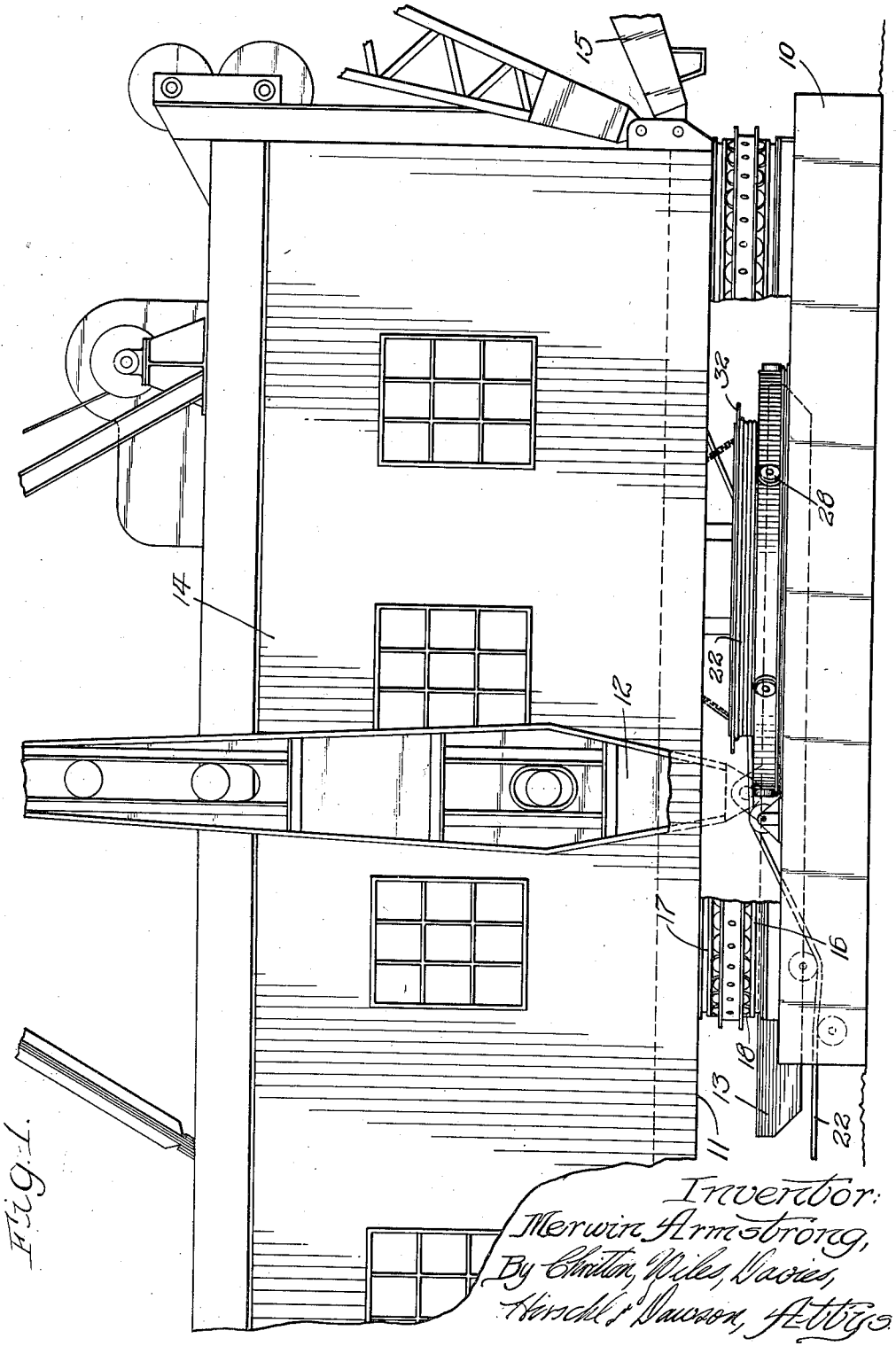

May 9, 1939.   M. ARMSTRONG   2,157,781
CABLE REEL
Filed April 11, 1938   5 Sheets-Sheet 1

Inventor:
Merwin Armstrong,
By Clinton, Miles, Davies,
Hinckl & Dawson, Attys.

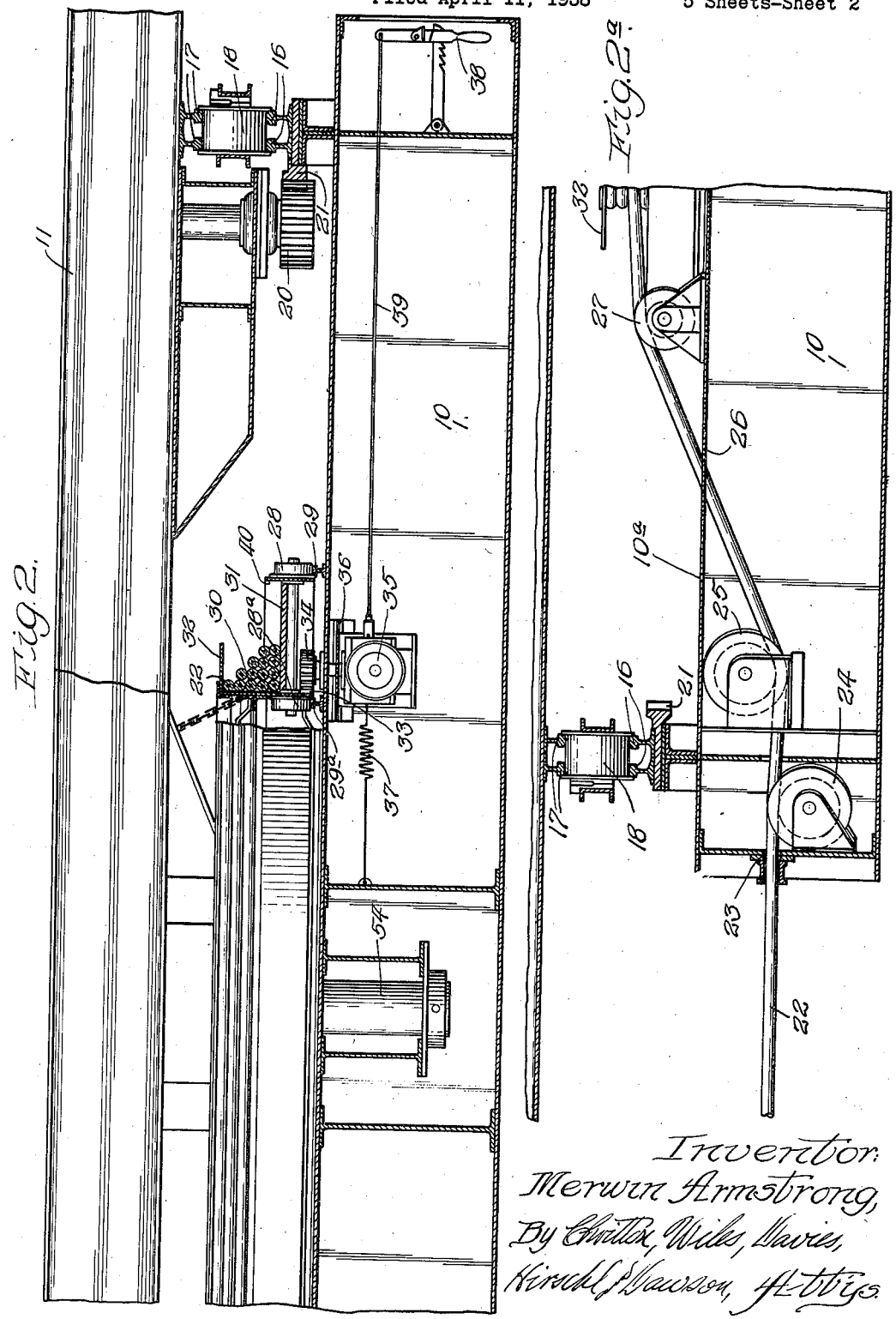

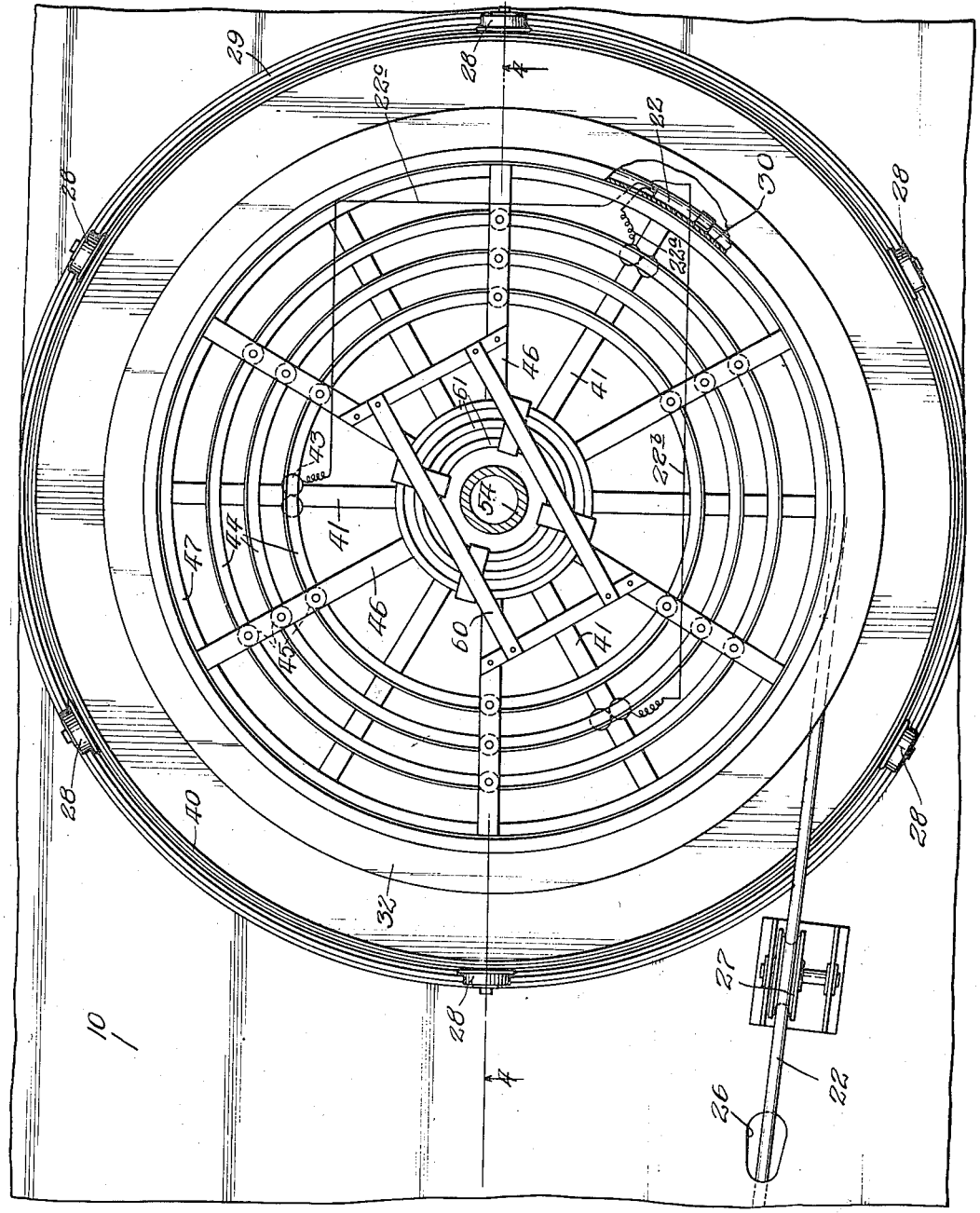

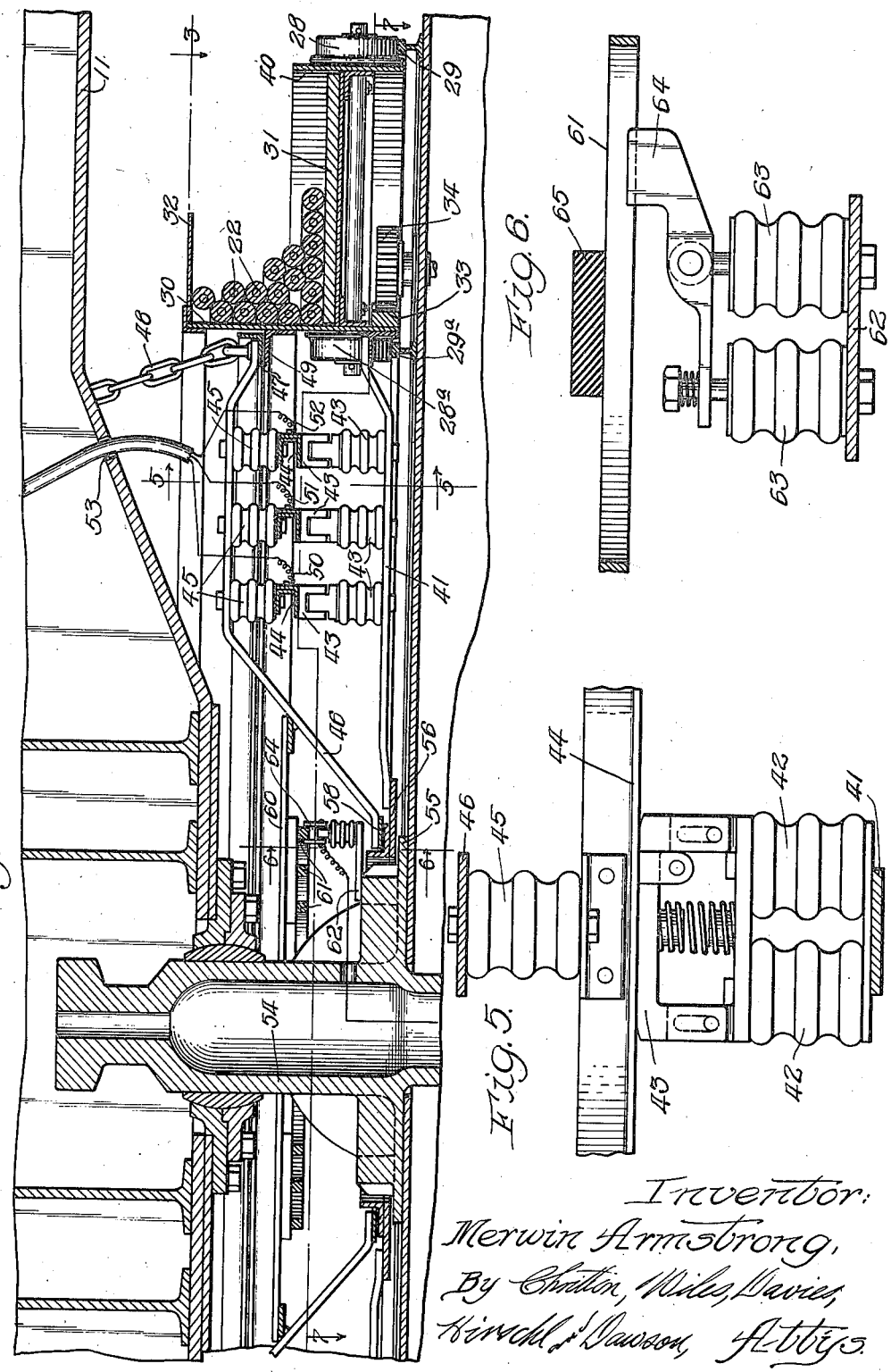

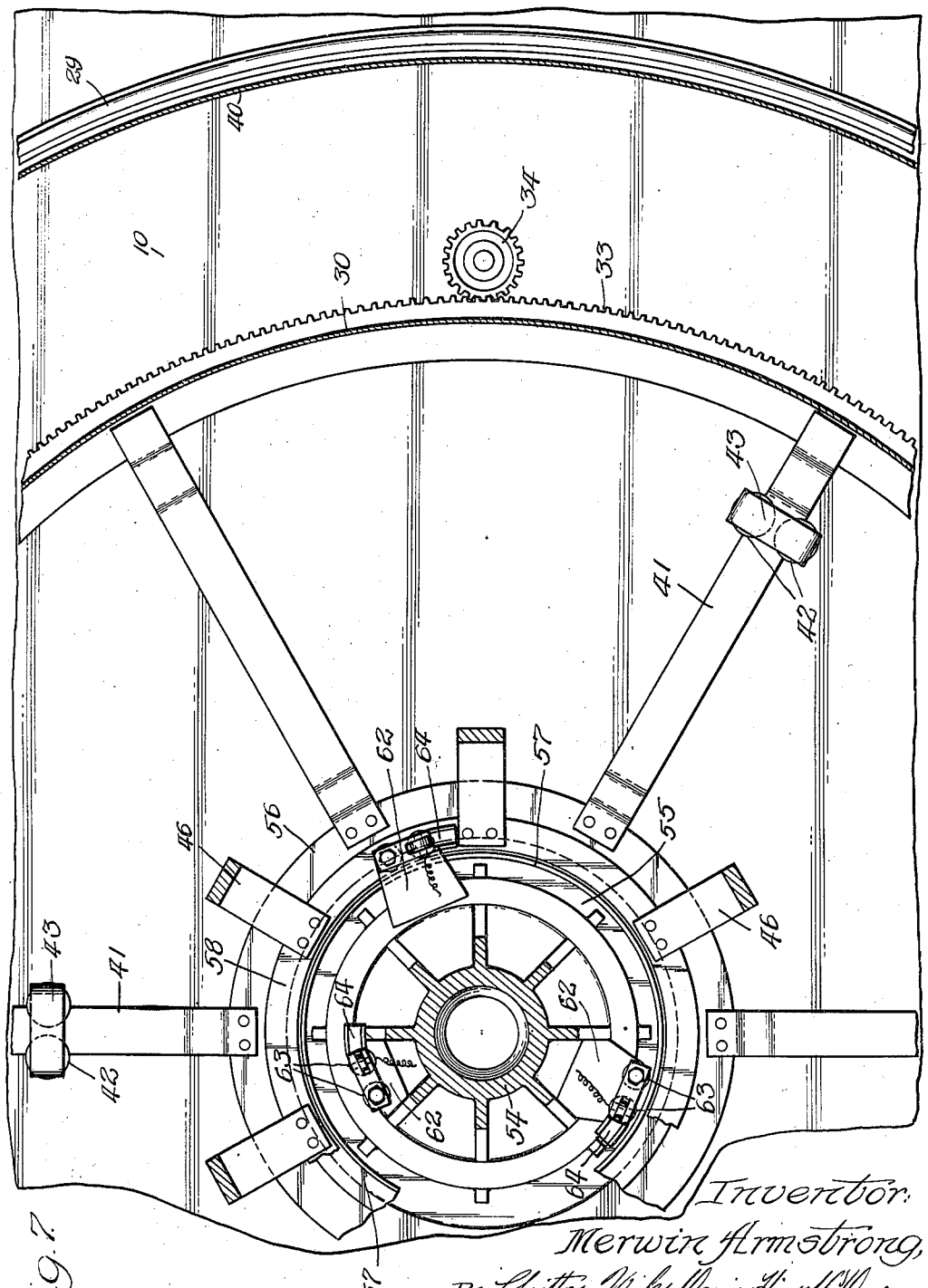

Patented May 9, 1939

2,157,781

UNITED STATES PATENT OFFICE 2,157,781

CABLE REEL

Merwin Armstrong, Hinsdale, Ill., assignor to Page Engineering Company, Chicago, Ill., a corporation of Illinois Application April 11, 1938, Serial No. 201,395

15 Claims. (Cl. 191—12)

This invention relates to improvements in cable reels and more especially such a reel in combination with excavating or material handling apparatus like drag buckets, scrapers, diggers, trenchers, dredges, derricks, and the like, and more especially such apparatus, devices, and mechanisms that are electrically operated or which employ electricity furnished from an outside supply in connection with their operation.

The invention is adapted for use especially in combination with apparatus of the character described having a base with a rotatable platform mounted thereon. Where electricity is supplied to such apparatus from an outside source, an electric cable is employed. Heretofore difficulty has been encountered in taking care of the cable during movements of the apparatus and in making the connection between the cable and the rotatable platform. Apparatus of the character described is ordinarily very large and heavy and the cable supplying electricity may also be very heavy, sometimes being as much as an inch or two in diameter. When the apparatus moves toward the source of supply some means must be provided for taking up the cable slack and contrariwise an excess of cable should be available to permit extended movement of the apparatus.

Among the features of my invention is the provision of a reel adapted to hold any portion of the cable not immediately in use. The reel is adapted to pay out or take in the cable as necessary to accommodate movements of the apparatus.

Another feature of the invention is the provision of means for feeding electricity from the cable to the rotatable platform to permit free rotation of the latter without interference with the current supply.

Another feature of my invention is the provision of improved reel construction, mounting and driving means therefor together with improvements in the structural mounting of such a reel in apparatus having a base with a rotatable platform mounted thereon.

Other features and advantages will appear more fully as I proceed with my specification.

In that form of device embodying the features of my invention shown in the accompanying drawings: Fig. 1 is a view in side elevation; Figs. 2 and 2a are a vertical sectional view; Fig. 3 is a view taken as indicated by the line 3 of Fig. 4; Fig. 4 is a view taken as indicated by the line 4 of Fig. 3; Fig. 5 is a view taken as indicated by the line 5 of Fig. 4; Fig. 6 is a view taken as indicated by the line 6 of Fig. 4; and Fig. 7 is a view taken as indicated by the line 7 of Fig. 4.

As shown in the drawings, the apparatus comprises in general a base 10 with a rotatable platform 11. Such apparatus is usually equipped with some kind of walking or moving mechanism, here indicated in general by the legs 12 with the feet 13.

Mounted on the platform 11 is the usual house 14 containing the operating machinery. The apparatus also may carry a suitable boom 15 from the end of which is suspended a drag bucket (not shown). No attempt here has been made to show the particular kind of scraper, digging apparatus or derrick mechanism used as the invention is applicable with any apparatus of that type employing a base with a rotatable platform mounted thereon.

As here shown, the base 10 carries the usual circular rails 16; and the platform, the corresponding rails 17. 18, 18 indicate the usual wheels between the rails 16 and 17 by virtue of which the platform 11 is rotatably supported on the base 10.

29 indicates the usual pinion operating on the circular rack 21 carried by the base 10 through which rotation of the platform 11 is imparted.

22 indicates an electric cable connected to a source of supply (not shown) through which electricity is conducted to the apparatus. The cable is led into the base 10 through the hole 23 and thence passes over the guide roller 24 and then under the guide roller 25 and upwardly through the opening 26 in the upper surface 10a of the base 10. From this the cable is led over another guide roller 27 on top of the base and then goes to the reel, forming the principal part of my invention.

This reel is rotatably supported on the base 10 concentric with the platform 11 and lies between the base and the platform, with respect to both of which it is rotatable. The axis (extended) of rotation of the reel coincides with the axis of rotation of the platform.

The reel is rotatably supported on the base 10 by six outer flanged wheels 28 operating on the outer circular rail 29 on the base 10, and by six corresponding inner wheels 28a operating on the inner circular rail 29a. The reel itself includes the drum 30 with the lower horizontal flange 31 and the upper horizontal flange 32. Below the flange 31 the drum 30 carries the circular rack 33 adapted to be driven by the pinion 34 operated by the motor 35. Through this means the reel can be rotated to wind the cable 22 thereon to take up slack or pay it out as desired. The motor 35 is mounted on slides 36, the spring 37 acting yieldingly to hold the pinion 34 in mesh with the rack. The hand lever 38 can be operated to pull the rod 39 to slide the motor outwardly to disengage the pinion 34 from the rack if desired. This may be done, for example, if it is wished to pay out the cable by letting the cable tension turn the reel without moving the pinion 34. Any suitable electric supply (not shown) for driving the motor 35 may be employed. The guide roller 27 is high enough so that the cable 22 will be led therefrom over the low vertical flange 40 on the outer edge of the horizontal flange 31 so that the cable will be wound on the reel with the turns lying on the flange 31 and piling up against the drum 30 as shown in Figs. 2 and 4.

The reel carries a plurality of radial members or spokes 41 carrying insulators 42 having mounted thereon shoes or brushes 43 engaging conducting rings or rails 44 carried by the insulators 45 on the spokes 46 attached to the ring 47 which is anchored by the chains 48 to the platform 11. The ring 47 rests on an angle iron 49 carried on the inside of the drum 30 but is rotatable with respect thereto.

For a three-wire supply system as shown, there are three rails or rings 44 and three brushes 43. In such case the cable 22 carries three wires, one leading to each of the shoes 43 as indicated by wires 22a, 22b and 22c (see Fig. 3). Current is taken off of the rails or rings 44 by suitable wires 50, 51 and 52 at any suitable points, it being understood that said wires are led in any suitable manner through the platform 11 for supplying the apparatus. It is necessary to show only the connections as indicated in Fig. 4. The ring 47 with the spokes 46 is anchored to the platform 11 by the chains 48 and moves therewith although slight relative motion between the two is permitted. Consequently the three wires 50, 51 and 52 may easily be led through any suitable hole in the platform 11 as indicated by 53 in Fig. 4.

54 indicates the center pivot casting supported in the base 10 and furnishing an axis for the rotatable platform 11. This casting is here shown as provided with a flange 55 rotatably supporting a ring 56 to which the inner ends of the spokes 41 are attached. Mounted on the ring 56 is an angle iron ring 57 on which rotatably rests the ring 58 to which the inner ends of the spokes 46 are attached.

Mounted on the spokes 46 is a rectangular frame 60 carrying the three circular rails 61 adapted to feed current downwardly from the platform to the base for driving the motor 35. These rails being mounted on the spokes 46, turn with the platform. The pivot casting 54 carries the arms 62 having mounted thereon the insulator 63 carrying the shoes or brushes 64 engaging the rails 61. Suitable insulators 65 are provided for the rails 61. The wiring connections are not shown. It will suffice to say that current is fed to the rings 61 which rotate with the platform, and taken off from the rings by the brushes 64 mounted on the stationary pivot 54. From these brushes, current is taken through wires (not shown) into the base to the motor 35.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

What I claim as new and desire to secure by Letters Patent is:

1. Apparatus of the character described, including: a movable base; a machinery supporting platform rotatably mounted on the base of a circular track, and spaced from the base; and an electric cable take-up reel between the base and platform and inside of the track, the axis (extended) of the reel coinciding with the axis of rotation of the platform.

2. Apparatus of the character described, including: a movable base; a machinery supporting platform rotatably mounted on the base on a circular track, and spaced from the base; and an electric cable take-up reel between the base and platform and inside of the track, the axis (extended) of the reel coinciding with the axis of rotation of the platform, said reel being rotatably supported on the base.

3. Apparatus as claimed in claim 1 with means for rotating the reel.

4. Apparatus as claimed in claim 2 with means for rotating the reel.

5. Apparatus as claimed in claim 1 with means for conducting current from cable on the reel to the platform.

6. Apparatus as claimed in claim 2 with means for conducting current from cable on the reel to the platform.

7. Apparatus as claimed in claim 1 with means for conducting current from cable on the reel to the platform, said means including a plurality of conductors movable with the platform and a plurality of conductors contacting therewith and movable with the reel.

8. Apparatus as claimed in claim 2 with means for conducting current from cable on the reel to the platform, said means including a plurality of conductors movable with the platform and a plurality of conductors contacting therewith and movable with the reel.

9. Apparatus as claimed in claim 1 with means for conducting current from cable on the reel to the platform, said means including cooperating sets of conducting rings and brushes relatively rotatable with respect to each other, one set being movable with the platform and the other set with the reel.

10. Apparatus as claimed in claim 2 with means for conducting current from cable on the reel to the platform, said means including cooperating sets of conducting rings and brushes relatively rotatable with respect to each other, one set being movable with the platform and the other set with the reel.

11. Apparatus as claimed in claim 1 with means for guiding a cable through the base and to the reel.

12. Apparatus as claimed in claim 2 with means for guiding a cable through the base and to the reel.

13. Apparatus of the character described, including: a movable base; a machinery supporting platform rotatably mounted on the base on a circular track, and spaced from the base; an electric cable take-up reel between the base and platform and inside of the track, the axis (extending) of the reel coinciding with the axis of rotation of the platform, said reel having a drum and lower horizontal flange; and means for leading a cable to the drum and above the horizontal flange.

14. Apparatus of the character described, including: a movable base; a machinery supporting platform rotatably mounted on the base on a circular track, and spaced from the base; an electric cable take-up reel between the base and platform and inside of the track, the axis (extended) of the reel coinciding with the axis of rotation of the platform, said reel having a drum and lower horizontal flange; and means for leading a cable through the base to the drum and above the horizontal flange.

15. Apparatus of the character described, including: a movable base; a machinery supporting platform rotatably mounted on the base on a circular track, and spaced from the base; an electric cable take-up reel between the base and platform and inside of the track, the axis (extended) of the reel coinciding with the axis of rotation of the platform; spokes carried by the reel; contact members carried by the spokes; a ring rotatable with the platform; spokes on said ring; and contact members carried by said spokes cooperating with the first-mentioned contact members.

MERWIN ARMSTRONG.